United States Patent
Woodside

[19]

[11] Patent Number: 5,899,478
[45] Date of Patent: May 4, 1999

[54] STABILITY MAINTAINING SHOCK ABSORBING BICYCLE FRONT FORK AND TRAILING ARM ASSEMBLY

[76] Inventor: Terence D. Woodside, 89 McCaul St., Toronto, Canada, M5T 2X3

[21] Appl. No.: 08/723,133

[22] Filed: Sep. 30, 1996

[51] Int. Cl.$^6$ .................................................. B62K 25/16
[52] U.S. Cl. ............................................ 280/276; 280/277
[58] Field of Search .................................. 280/276, 277, 280/279, 280, 283

[56] References Cited

U.S. PATENT DOCUMENTS

| | | | |
|---|---|---|---|
| 3,954,284 | 5/1976 | Phillips et al. | 280/277 |
| 5,413,368 | 5/1995 | Pong et al. | 280/277 |
| 5,427,208 | 6/1995 | Motobu et al. | 188/24.13 |
| 5,429,380 | 7/1995 | Lawwill | 280/277 |
| 5,431,426 | 7/1995 | Ijams et al. | 280/276 |
| 5,445,401 | 8/1995 | Bradbury | 280/276 |
| 5,449,155 | 9/1995 | Mack | 267/292 |
| 5,456,480 | 10/1995 | Turner et al. | 280/276 |
| 5,462,302 | 10/1995 | Leitner | 280/277 |
| 5,599,034 | 2/1997 | Brigden | 280/276 |
| 5,749,590 | 5/1998 | Roerig | 280/276 |

FOREIGN PATENT DOCUMENTS

| | | | |
|---|---|---|---|
| 2494208 | 5/1982 | France | 280/276 |
| 3833880 | 4/1990 | Germany | 280/276 |

*Primary Examiner*—Anne Marie Boehler
*Attorney, Agent, or Firm*—Donald E. Hewson

[57] ABSTRACT

A stability maintaining shock absorbing bicycle front fork and trailing arm assembly comprises a hub member attached to the steering spindle for pivotal movement therewith. Left and right fork members are attached adjacent their top ends to the hub member. Left and right trailing arms are pivotally mounted one on each of the left and right fork members. A bicycle wheel mounting member is disposed on each of the trailing arms so as to permit mounting of a front bicycle wheel thereon. In use, the left and right trailing arms are concurrently pivotally movable between a forward position whereat the axis of rotation of the front bicycle wheel mounted on the trailing arm assembly is disposed forwardly of the steering axis and between the steering axis and the common pivot axis, and a trailing position whereat the axis of rotation is disposed closer to the steering axis than when in the forward position and is also displaced vertically closer to the common pivot axis than when in the forward position. A variable length shock absorber is securely mounted at its top end on the hub member. A linkage arm is pivotally mounted at its bottom end to one of the trailing arms, and is pivotally mounted at its top end to the shock absorber. Alternatively, a linkage arm may comprise a variable length shock absorber. A spring biases the shock absorber to its extended configuration the trailing arms to their respective forward positions.

22 Claims, 4 Drawing Sheets

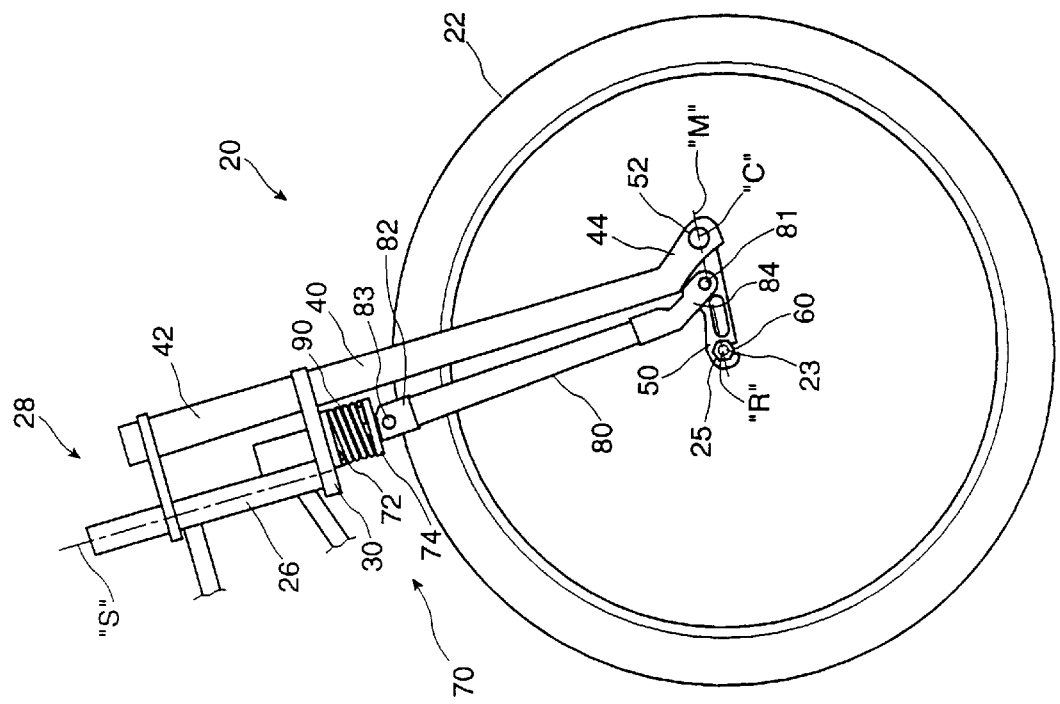
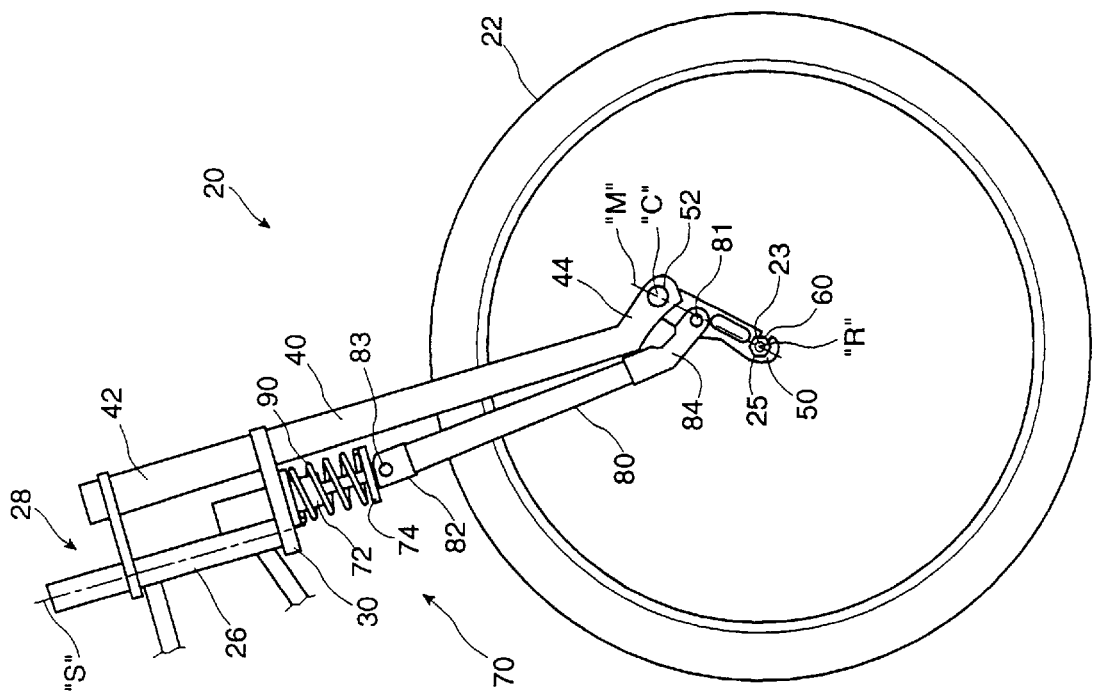
Fig. 4A
Fig. 4B

STABILITY MAINTAINING SHOCK ABSORBING BICYCLE FRONT FORK AND TRAILING ARM ASSEMBLY

FIELD OF THE INVENTION

This invention relates to bicycle suspension systems and more particularly to shock absorbing bicycle front fork and trailing arm assemblies for mounting a front wheel otherwise conventional bicycle.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which:

FIG. 4A is a side elevational view of a first preferred embodiment of the stability maintaining shock absorbing bicycle front fork and trailing arm assembly of the present invention, in a normally extended configuration;

FIG. 4B is a side elevational view similar to FIG. 5A, with the front fork and trailing arm assembly in a compressed configuration;

BACKGROUND OF THE INVENTION

Bicycles have been known in the world for well over one hundred years. The basic form and resulting function of bicycles were established very early in the development of the bicycle—that is to say that even most very early bicycles comprised a frame, a non-steerable rear wheel powered by a crank arm type pedal linked to the rear wheel through a chain and sprocket assembly, and a steerable front wheel assembly including a front wheel rotatably mounted on a pair of left and right front forks. The front forks are joined together at a hub connected to the steering spindle. The steering spindle is pivotally mounted in a front frame portion for pivotal movement about a steering axis. The steerable front wheel assembly is controllable by means of a manually manipulable hand grip. This fundamental form and function is still found in virtually all conventional bicycles.

Figure 1:
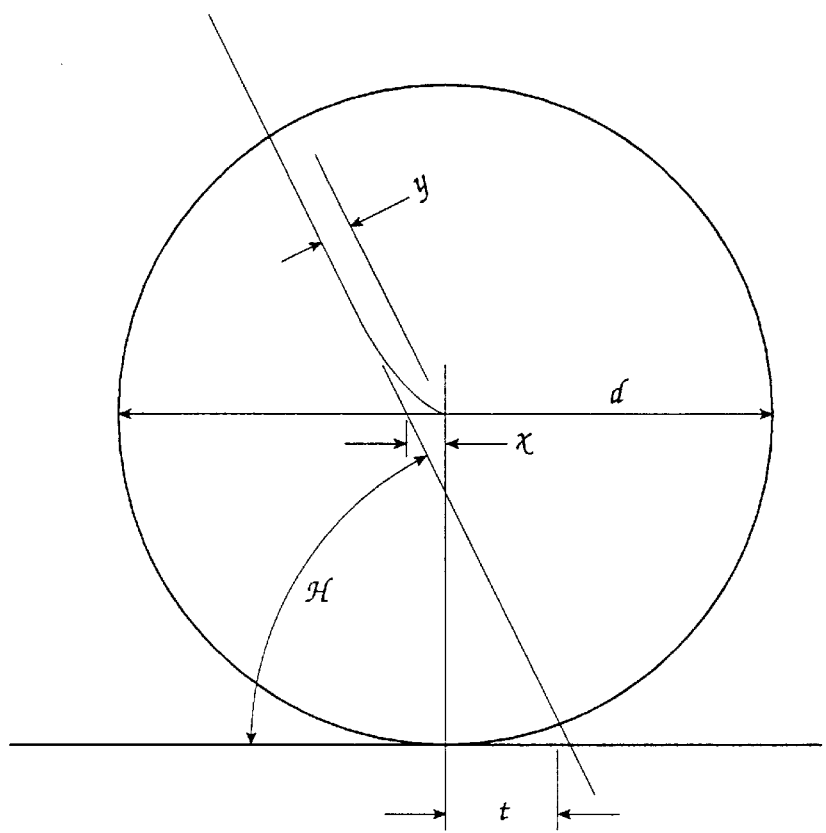
FIG. 1 is a simplified pictorial representation of a conventional front forks with a bicycle wheel mounted thereon, and showing various geometrical measurements.
Figure 2:
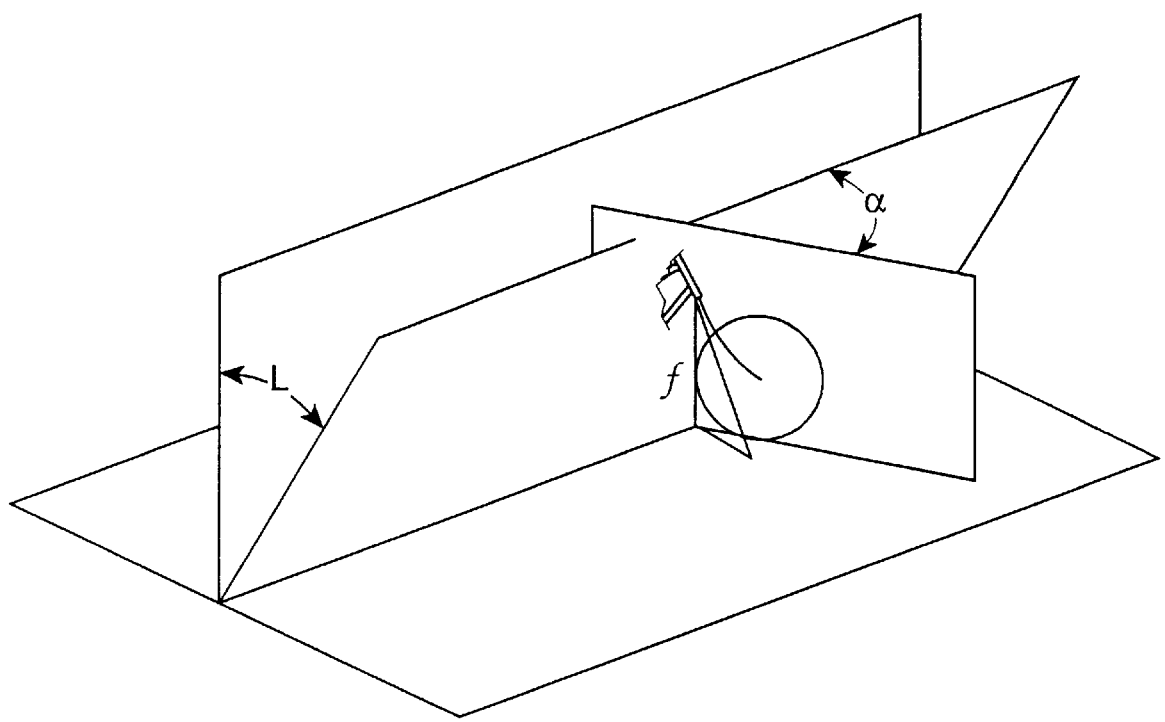
FIG. 2 is a simplified pictorial representation of a front portion of a conventional bicycle frame and front forks, with a bicycle wheel mounted thereon, and showing the geometry involved therewith during turning of the front forks and wheel.

One feature that was included even on very early conventional bicycles is that of forward curvature of the front forks, which forward curvature causes the front forks to extend forwardly at their bottom ends to terminate at a point ahead of the steering axis of the bicycle. The reason for such forward extension of the front forks is to provide a front fork offset y, as can be seen in FIG. 1. The front fork offset y is defined as the perpendicular distance between the steering axis and the axis of rotation of the front wheel. The purpose of the front fork offset is to provide stability to the steering of a bicycle. The stability of the bicycle is, in essence, the measure of the tendency of the bicycle to remain controllable, and therefore rideable, during steering manoeuvres. It is generally accepted that stability may be expressed by the following relation:

$$\mu \equiv \left( \frac{\partial^2 [f/d]}{\partial \alpha \partial L} \right)_{\alpha=0}$$

wherein f is the frame height, d is the diameter of the front wheel (thereby making f/d the relative frame height), $\alpha$ is the steering angle—or, in other words, the angle between the plane of the frame of the bicycle and the plane of the front wheel—, and L is the lean angle—or, in other words, the angle between the plane of the frame and a vertical plane. Empirical evidence indicates that using this relation, bicycles tend to have good steering characteristics when $\mu$ is between −1 and −3. It can be seen in FIG. 2, that the lean angle L is affected by the front fork offset. Therefore, the stability is affected by the front fork offset.

Figure 3:
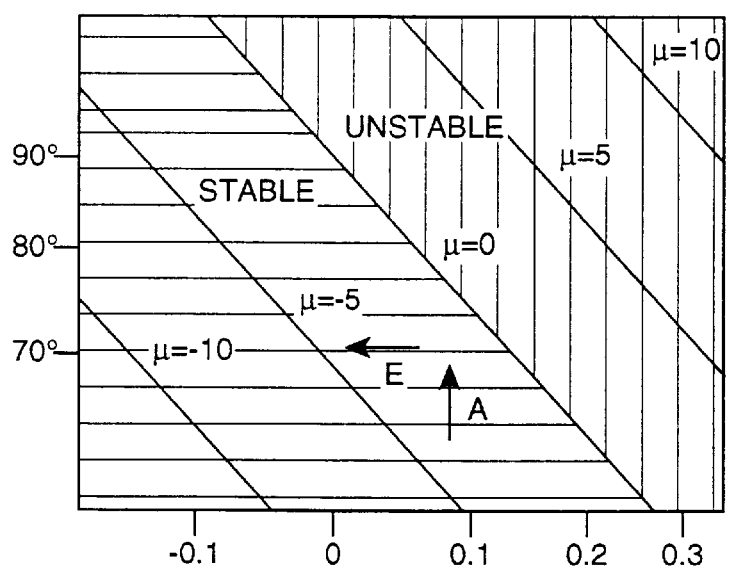
FIG. 3 is a graph of the relative front projection versus the head angle of various bicycles.

The concept of stability of a bicycle can perhaps be more readily understood as expressed graphically in FIG. 3, which relates the stability value $\mu$ to the relative front projection of the axis of rotation of the front wheel as compared to the steering axis and the head angle. The stability value $\mu$ is indicated for a variety of bicycles. The relative front projection of the axis of rotation of the front wheel is defined as the horizontal distance between the axis of rotation of the front wheel and the point at which the steering axis intersects a horizontal line passing therethrough, divided by the diameter of the front wheel, as can be seen in FIG. 1. As can be seen from FIG. 3, most bicycles have a relative front projection x in the order of +0.1 and a stability value $\mu$ between about −1 and −3. As can be discerned through FIGS. 1 and 3, the relative front projection is related to the front fork offset y and the head angle H, with the head angle is the angle between the ground and the steering axis. The head angle H and the relative front projection x therefore also affect the stability of a bicycle, since they are related to the front fork offset.

It would therefore seem reasonable that, in order to provide an extremely safe bicycle, it would merely be a matter of increasing the stability of a bicycle such that the stability value $\mu$ is between about perhaps −5 and −10. Such increase in stability could be accomplished simply by decreasing the front fork offset, and therefore the relative front projection, and/or decreasing the head angle; however, it has been found that it is necessary to have a relative front projection in the order of 0.05 to 0.10 and a head angle from about 72° to about 75° in order to provide suitable handling characteristics for a bicycle. In other words, in order to have reasonable stability and acceptable handling characteristics, the relative front projection and the head angle must fall within a certain range. Any variation of the front relative projection or head angle outside the above stated values will compromise either the stability or the handling characteristics of a bicycle. Most conventional bicycles are fixed in terms of their head angle, relative front projection, and so on. Accordingly, their handling characteristics and stability are predetermined. Some bicycles, however, such as more elaborate mountain bicycles, have shock absorbing front fork assemblies wherein the effective length of the front fork assembly necessarily changes. For instance, when the front wheel of a bicycle having a shock absorbing front fork assembly is raised off the ground and subsequently impacts back on the ground, the front portion of the frame continues to move downwardly with respect to the front wheel for a few centimeters. Accordingly, the effective height of the frame decreases temporarily.

Figure 5A:
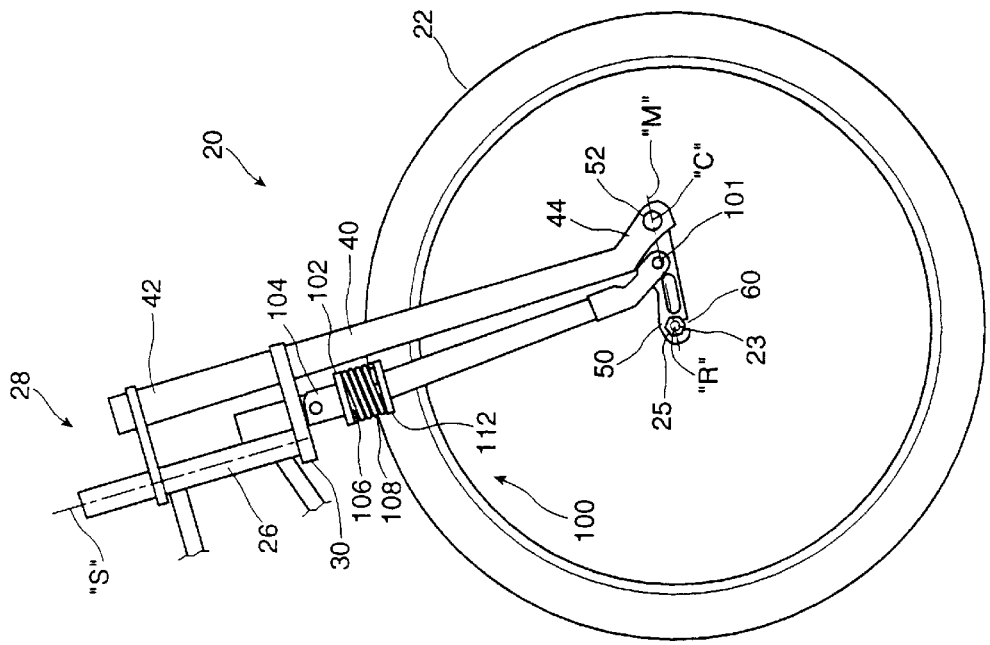
FIG. 5A is a side elevational view of a second preferred embodiment of the stability maintaining shock absorbing bicycle front fork and trailing arm assembly of the present invention, in a normally extended configuration.
Figure 5B:
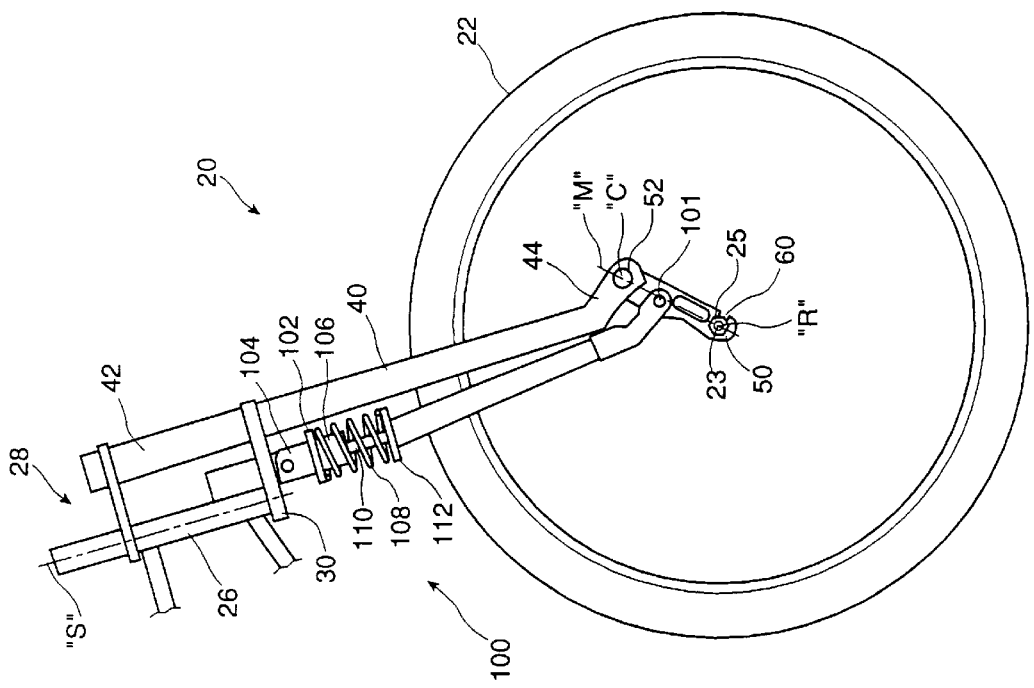
FIG. 5B is a side elevational view similar to FIG. 6A, with the front fork and trailing arm assembly in a compressed configuration.

As can be seen from FIGS. 4A and 4B, or from FIGS. 5A and 5B, when the frame height of a bicycle is decreased, that the head angle also increases. As can be seen in FIG. 3, as indicated by arrow A, when the head angle is increased, the stability is decreased. It has been found that, in mountain bicycles having a front fork assembly with about five to seven and one half centimeters (two to three inches) of travel, the maximum change of head angle affects the stability of the bicycle only a minor amount; however, in mountain bicycles having a front fork assembly with about fifteen centimeters (six inches) of travel, the maximum change in head angle significantly affects the stability of the bicycle. Such significant decrease in stability is potentially dangerous and must be compensated for. In order to maintain stability during full travel of a fork assembly with about fifteen centimeters (six inches) of travel, it is possible to counteract the increase in head angle by correspondingly decreasing the relative front projection—or in other words the front fork offset—of the axis of rotation of the front wheel.

It is therefore an object of the present invention to provide a stability maintaining shock absorbing bicycle front fork and trailing arm assembly for mounting a front wheel on a conventional bicycle, which bicycle front fork and trailing arm assembly is configured such that the front fork offset correspondingly decreases with a decrease in the relative frame height of the bicycle due to a corresponding compression of the front forks of the bicycle, thereby maintaining stable steering stable steering of the bicycle at all times.

It is therefore an object of the present invention to provide a stability maintaining shock absorbing bicycle front fork and trailing arm assembly for mounting a front wheel on a conventional bicycle, which bicycle front fork and trailing arm assembly maintains stable steering stable steering of the bicycle at all times, even for compression of the front fork assembly of about fifteen centimeters (six inches), or even greater.

DESCRIPTION OF THE PRIOR ART

The following prior art references are known to the inventor:

U.S. Pat. No. 3,954,284
U.S. Pat. No. 5,413,368
U.S. Pat. No. 5,427,208
U.S. Pat. No. 5,429,380
U.S. Pat. No. 5,431,426
U.S. Pat. No. 5,445,401
U.S. Pat. No. 5,449,155
U.S. Pat. No. 5,456,480
U.S. Pat. No. 5,462,302

These prior art patents disclose various kinds of suspension systems, fork assemblies, and the like. It is not known in the prior art to accommodate a compression of about fifteen centimeters (six inches) of a fork assembly while compensating for the change in stability that follows such compression of the front forks in prior art devices.

SUMMARY OF THE INVENTION

In accordance with one aspect of the present invention, there is provided a stability maintaining shock absorbing bicycle front fork and trailing arm assembly for mounting a front bicycle wheel on a conventional bicycle for rotation of the front bicycle wheel about a displaceable axis of rotation, wherein the bicycle has a steering spindle pivotally mounted in a front frame portion thereof for pivotal movement of the steering spindle about a steering axis. The variable length shock absorbing bicycle fork assembly comprises a hub member rigidly attached to the steering spindle for pivotal movement therewith. Opposed left and right fork members each having a top end and a bottom end, are rigidly attached adjacent their top ends to the hub member so as to depend therefrom. Left and right trailing arms are operatively mounted one on each of the left and right fork members, respectively, for pivotal movement of each trailing arm about a common pivot axis oriented generally parallel to the displaceable axis of rotation of the front bicycle wheel and generally perpendicular to the steering axis and disposed forwardly of the steering axis. Bicycle wheel mounting means are disposed one on each of the left and right trailing arms so as to permit mounting of a front bicycle wheel thereon such that the front bicycle wheel rotates about the displaceable axis of rotation. When the front bicycle wheel is mounted on the bicycle wheel mounting means on the left and right trailing arms, the left and right trailing arms are concurrently pivotally movable between a forward position whereat the displaceable axis of rotation of the front bicycle wheel mounted on the front fork and trailing arm assembly is disposed forwardly of the steering axis and between the steering axis and the common pivot axis, and a trailing position whereat the displaceable axis of rotation of the front bicycle wheel mounted on the front fork and trailing arm assembly is disposed closer to the steering axis than when in the forward position and is also displaced vertically closer to the common pivot axis than when in the forward position. Variable length shock absorbing means comprises an upper component and a lower component. The upper and lower components are slidably engaged one with the other for relative movement between an extended configuration and a compressed configuration, with the upper component securely mounted on the hub member. A linkage arm having a top end and a bottom end, is pivotally mounted at its bottom end to a selected one of the left and right trailing arms for pivotal movement about a linkage arm lower axis, and pivotally mounted at its top end to the lower component of the shock absorbing means for pivotal movement about a linkage arm upper axis, with the linkage arm upper and lower axes being substantially parallel to the displaceable axis of rotation. A spring biasing means is operatively mounted between the hub member and the selected trailing arm having the linkage arm mounted thereon, so as to bias the shock absorbing means to the extended configuration and to bias the left and right trailing arms to their respective forward positions.

In accordance with another aspect of the present invention, there is provided a stability maintaining shock absorbing bicycle front fork and trailing arm assembly for mounting a front bicycle wheel on a conventional bicycle for rotation of the front bicycle wheel about a displaceable axis of rotation, wherein the bicycle has a steering spindle pivotally mounted in a front frame portion thereof for pivotal movement of the steering spindle about a steering axis. The variable length shock absorbing bicycle fork assembly comprises a hub member rigidly attached to the steering spindle for pivotal movement therewith. Opposed left and right fork members each having a top end and a bottom end, are rigidly attached adjacent their top ends to the hub member so as to depend therefrom. Left and right trailing arms are operatively mounted one on each of the left and right fork members, respectively, for pivotal movement of each trailing arm about a common pivot axis oriented generally parallel to the displaceable axis of rotation of the front bicycle wheel and generally perpendicular to the steering axis and disposed forwardly of the steering axis. Bicycle wheel mounting means are disposed one on each of the left and right trailing arms so as to permit mounting of a front bicycle wheel thereon such that the front bicycle wheel rotates about the displaceable axis of rotation. When the front bicycle wheel is mounted on the bicycle wheel mounting means on the left and right trailing arms, the left and right trailing arms are concurrently pivotally movable between a forward position whereat the displaceable axis of rotation of the front bicycle wheel mounted on the front fork and trailing arm assembly is disposed forwardly of the steering axis and between the steering axis and the common pivot axis, and a trailing position whereat the displaceable axis of rotation of the front bicycle wheel mounted on the front fork and trailing arm assembly is disposed closer to the steering axis than when in the forward position and is also displaced vertically closer to the common pivot axis than when in the forward position. A variable length shock absorbing linkage arm comprises an upper component having a top end and a bottom end, and a lower component having a top end and a bottom end. The upper and lower components are slidably engaged one with the other for relative movement between an extended configuration and a compressed configuration, with the upper component pivotally mounted at its top end on the hub member for pivotal movement about a linkage arm upper axis, and with the lower component being pivotally mounted at its bottom end to a selected one of the left and right trailing arms for pivotal movement about a linkage arm lower axis, with the linkage arm upper and lower axes being substantially parallel to the displaceable axis of rotation. A spring biasing means is operatively mounted between the hub member and the selected trailing arm having the linkage arm mounted thereon, so as to bias the shock absorbing means to the extended configuration and to bias the left and right trailing arms to their respective forward positions.

DETAILED DESCRIPTION OF THE PREFERRED EMBODIMENTS

Figure 6:
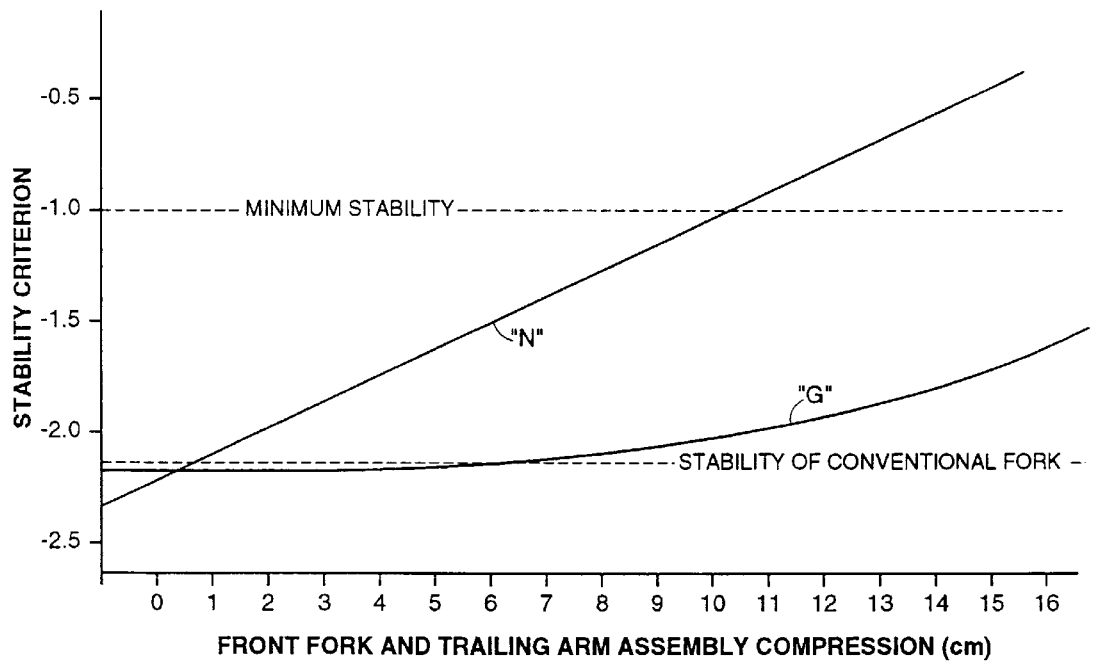
FIG. 6 is a graph comparing the stability curves of both a conventional telescopic front fork assembly and the front fork and trailing arm assembly of the present invention.

Reference will now be made to FIGS. 4 through 6, in which first and second preferred embodiments of the stability maintaining shock absorbing bicycle front fork and trailing arm assembly of the present invention, are discussed.

Reference is first made to FIGS. 4A and 4B, where a first preferred embodiment of the stability maintaining shock absorbing bicycle front fork and trailing arm assembly 20 is shown. The front fork and trailing arm assembly 20 is for mounting a front bicycle wheel 22 on a conventional bicycle. The front wheel 22 rotates about a displaceable axis of rotation R. The bicycle has a steering spindle 26 pivotally mounted in a front frame portion 28 thereof, for pivotal movement of the steering spindle 26 about a steering axis S.

The variable length shock absorbing bicycle front fork assembly 20 comprises a hub member 30 rigidly attached to the steering spindle 26, such as by means of welding, or other suitable means, for concurrent pivotal movement of the hub member 30 with the steering spindle 26. Opposed left and right fork members 40 each having a top end 42 and a bottom end 44, and being rigidly attached adjacent their top ends 42 to the hub member 30 so as to depend therefrom, are each rigidly attached to the hub member 30, such as by means of welding. Alternatively they may be integrally formed one with the other, or by any other suitable conventional fastening means. As shown, the left and right fork members 40 are substantially identical one to the other. Accordingly, these and other components that are duplicated one on each side of the front bicycle wheel 22, are each indicated by a single reference numeral, for the sake of clarity.

When the steering spindle 26 is turned by the handle bars (not shown) of the bicycle, the hub member 30, the left and right fork members 40, and ultimately the front bicycle wheel 22 rotate therewith so as to permit steering of the bicycle.

Left and right trailing arms 50 are pivotally mounted with one trailing arm 50 on each of the left and right fork members 40, respectively, by means of conventional bolts 52 and co-operating nuts (not shown), or by any other suitable mounting means for pivotal movement of each trailing arm 50 about a common pivot axis C. Each of the left and right trailing arms 50 is about 10 cm to 15 cm long, with the distance along the trailing arms 50 from the common pivot axis C to the displaceable axis of rotation R being between about 5 cm and 15 cm—typically, about 10 to 15 cm—and preferably about 12 cm. The common pivot axis C is oriented generally parallel to the displaceable axis of rotation R of the front bicycle wheel 22, and also oriented generally perpendicularly to the steering axis S. The common pivot axis C is also disposed forwardly of the steering axis S, so that the left and right trailing arms 50 can rotate rearwardly toward the steering axis S, as will be discussed in greater detail hereafter.

A bicycle wheel mounting means comprising a pair of mounting sockets 60 disposed one on each of the left and right trailing arms 50, permits mounting of the front bicycle wheel 22 on the left and right trailing arms 50 by means of an axle 23 and co-operating nuts 25. Typically, an oversize axle is employed. The front bicycle wheel 22 is mounted on the left and right trailing arms 50 such that the front bicycle wheel 22 rotates about the displaceable axis of rotation R. It can be seen that the displaceable axis of rotation R moves as the left and right trailing arms 50 pivot about their common pivot axis C. When the front wheel 22 is mounted on the left and right trailing arms 50, the left and right trailing arms 50 are concurrently pivotally moveable between a forward position as shown in FIG. 4A, and a trailing position as shown in FIG. 4B. When the left and right trailing arms are in their respective forward positions, the displaceable axis of rotation R of the front bicycle wheel 22 mounted on the front fork and trailing arm assembly 20 is disposed forwardly of the steering axis S by a distance of between about 2 cm to 8 cm, and preferably about 5 cm. Further, the displaceable axis of rotation R of the front bicycle wheel 22 is between the steering axis S and the common pivot axis C, when the left and right trailing arms 50 are in their forward position. When the left and right trailing arms are in their respective trailing positions, the displaceable axis of rotation R of the front bicycle wheel 22 mounted on the front fork and trailing arm assembly 20 is disposed closer to the steering axis S, and preferably very near or even on the steering axis S, than is the case when the left and right trailing arms 50 are in their respective forward positions. The displaceable axis of rotation R is also displaced vertically closer to the common pivot axis when the left and right trailing arms 50 are in their respective trailing positions than when in their respective forward positions.

The left and right trailing arms 50 are disposed along a main axis M, which main axis M extends from, and passes through, the common pivot axis C to the displaceable axis of rotation R. In the preferred embodiment, the main axis M of the left and right trailing arms 50 is disposed at an angle of about 5° with respect to the horizontal, when the left and right trailing arms 50 are in their respective trailing positions.

A variable length shock absorbing means 70, comprising an upper component 72 securely attached to the hub member 30 and a lower component 74 depending from the upper component 72. The upper component 72 and the lower component 74 are slidably engaged one with the other for relative movement between an extended configuration, as can be seen in FIG. 4A, and a compressed configuration, as can be seen in FIG. 4B. In the preferred embodiment, the lower component 74 of the variable length shock absorbing means 70 can travel with respect to the upper component 72 by a distance of slightly greater than 15 cm, as dictated by the necessity of a suspension system of a bicycle, such as a mountain bicycle, to absorb severe impact during riding. The variable length shock absorbing means 70 further comprises a fluidic damper 76 operatively disposed between the upper component 72 and the lower component 74, so as to provide a physical resistance to the relative movement of the upper component 72 and the lower component 74 between their extended configuration and their compressed configuration.

A linkage arm 80 having a top end 82 and a bottom end 84, is pivotally mounted at its bottom end 84 to a selected one of the left and right trailing arms 50 by conventional mounting means such as a bolt 81 extending through apertures (not shown) in the selected one of the left and right trailing arms 50 and the linkage arm 80, retained therein by a co-operating nut (not shown). The linkage arm 80 is thereby pivotally mounted for pivotal movement about a linkage arm lower axis B, as the left and right trailing arms 50 pivot about their common pivot axis C. Preferably, the aperture disposed on the selected one of the left and right trailing arms 50, and therefore the linkage arm lower axis B, is positioned between the common pivot axis C and the displaceable axis of rotation R.

The linkage arm 80 is also pivotally mounted at its top end 82 to the lower component 74 of the variable length shock absorbing means 70 for pivotal movement about a linkage arm upper axis U, with such pivotal movement occurring when the left and right trailing arms 50 pivot about their common pivot axis C. It can be seen in FIGS. 4A and 4B that the linkage arm upper axis U and the linkage arm lower axis B are substantially parallel to the displaceable axis of rotation R. Such pivotal mounting of the linkage arm 80 at its top end 82 to the lower component 74 of the variable length shock absorbing means 70 and at its bottom end 84 to the selected one of the left and right trailing arms 50, permits the necessary angular movement of the linkage arm 80 with respect to the variable length shock absorbing means 70, so as to accommodate the pivotal movement of the left and right trailing arms 50 when the front bicycle wheel 22 is forced upwardly during riding of the bicycle 24. Such angular movement of the linkage arm 80 permits the necessary travel of 15 cm, or even more, of the lower component 74 with respect to the upper component 72, as required to absorb large bumps, as will be discussed in greater detail hereafter.

A spring biasing means 90 in the form of a coil spring is mounted between the upper component 72 and the lower component 74 of the variable length shock absorbing means 70, so as to bias the variable length shock absorbing means 70 to its extended configuration, and thereby also bias the left and right trailing arms 50 to their respective forward positions.

In use, it is necessary that the suspension of the bicycle, especially the stability maintaining shock absorbing bicycle front fork and trailing arm assembly 20, permit vertical travel of the displaceable axis of rotation R of the front bicycle wheel 22, such that the change in vertical distance between the displaceable axis of rotation R and a fixed point on the hub member 30 is decreasable by at least 15 cm, when the left and right trailing arms are pivotally moved from their respective forward positions to their respective trailing positions, as indicated by arrow C, such as when a bump is encountered by the front wheel 22. The left and right trailing arms 50 are pivotally moved from their forward position, as can be seen in FIG. 4A, to their trailing position, as can be seen in FIG. 4B, whereat the displaceable axis of rotation R is near or on the steering axis S. Also, the linkage arm 80 is pivotally moved so as to pivot in a direction indicated by arrow D about the linkage arm upper axis U. Further, the linkage arm 80 pushes upwardly on the lower component 74 of the variable length shock absorbing means 70, which shock absorbing means 70 is forced to its compressed configuration, so as to absorb the impact of the relative upward movement of the front bicycle wheel 22. The head angle H of the steering axis S is correspondingly increased, by a few degrees, when the front bicycle wheel 22 is in the position as shown in FIG. 4B. Accordingly, as can be seen in FIG. 3, at arrow A, the potential stability of the bicycle would decrease. Quite unexpectedly, in order to compensate for this potential decrease in stability, the movement of the left and right trailing arms 50 permits the displaceable axis of rotation R to be near the steering axis S, which decreases the front fork projection x. As can be seen in FIG. 3, at arrow E, decreasing the relative front projection x compensates for the potential loss of stability due to the change in head angle, thereby allowing the bicycle to remain stable. Such pivotal movement of the left and right trailing arms 50 to provide sufficient decrease in the relative front projection x, for large decreases (in the order of 15 cm) in the vertical distance between the displaceable axis of rotation R and a fixed point on the hub member 30 can only be accomplished by means of a linkage arm 80 that pivots at both its bottom end 84 and its top end 82.

In a second preferred embodiment, as is shown in FIGS. 5A and 5B, a variable length shock absorbing linkage arm 100 can replace the variable length shock absorbing means 70 and the linkage arm 80 of the first preferred embodiment of FIGS. 4A and 4B. The variable length shock absorbing linkage arm 100 comprises an upper component 102 having a top end 104 and a bottom end 106, and a lower component 108 having a top end 110 and a bottom end 112. The upper component 102 and the lower component 108 are slidably engaged one with the other for relative movement between an extended configuration and a compressed configuration. The upper component 102 is pivotally mounted at its top end 104 on the hub member 30 for pivotal movement about a linkage arm upper axis U. The lower component 108 is pivotally mounted at its bottom end 112 to a selected one of the left and right trailing arms 50, for pivotal movement about a linkage arm lower axis B. The linkage arm upper axis U and linkage arm lower axis B are substantially parallel to the displaceable axis of rotation R. In a manner similar to that of the first preferred embodiment, the variable length shock absorbing linkage arm 100 further comprises a fluidic damper 114 operatively disposed between the upper component 102 and the lower component 108. Preferably, the vertical distance between the displaceable axis of rotation R and a fixed point F on the hub member 30 is decreasable by at least 15 cm, when the left and right trailing arms move from their respective forward positions to their respective trailing positions, by means of compression of the variable length shock absorbing linkage arm 100.

The stability of a bicycle having the stability maintaining shock absorbing bicycle front fork and trailing arm assembly 20, is maintained throughout movement of the left and right trailing arms 50 from their respective forward positions to their respective trailing positions, as is shown by curve G in FIG. 6, as compared to a conventional telescopic front fork bicycle, as is shown by curve N in FIG. 6.

Other modifications and alterations may be used in the design and manufacture of the apparatus of the present invention without departing from the spirit and scope of the accompanying claims.

What is claimed is:

1. In combination, a bicycle having a bicycle frame and a stability maintaining shock absorbing bicycle front fork and trailing arm assembly for mounting a front bicycle wheel on said bicycle for rotation of the front bicycle wheel about a displaceable axis of rotation, wherein said bicycle has a steering spindle pivotally mounted in a front frame portion thereof for pivotal movement of the steering spindle about a steering axis; wherein said stability maintaining shock absorbing bicycle fork and trailing arm assembly comprises:

a hub member rigidly attached to said steering spindle for pivotal movement therewith;

opposed left and right fork members each having a top end and a bottom end, and being rigidly attached adjacent their top ends to said hub member so as to depend therefrom;

left and right trailing arms operatively mounted one on each of said left and right fork members, respectively, for pivotal movement of each trailing arm about a common pivot axis oriented generally parallel to said displaceable axis of rotation of said front bicycle wheel and generally perpendicular to said steering axis and disposed forwardly of said steering axis;

bicycle wheel mounting means disposed one on each of said left and right trailing arms so as to permit mounting of a front bicycle wheel thereon such that the front bicycle wheel rotates about said displaceable axis of rotation;

wherein, when said front bicycle wheel is mounted on said bicycle wheel mounting means on said left and right trailing arms, said left and right trailing arms are concurrently pivotally movable between a forward position whereat the displaceable axis of rotation of the front bicycle wheel mounted on said front fork and trailing arm assembly is disposed forwardly of said steering axis and between said steering axis and said common pivot axis, and a trailing position whereat the displaceable axis of rotation of the front bicycle wheel mounted on said front fork and trailing arm assembly is disposed closer to said steering axis than when in said forward position and is also displaced vertically closer to said common pivot axis than when in said forward position;

variable length shock absorbing means comprising an upper component and a lower component, wherein said upper and lower components are slidably engaged one with the other for relative movement between an extended configuration and a compressed configuration, with said upper component securely mounted on said hub member;

a linkage arm having a top end and a bottom end, and being pivotally mounted at its bottom end to a selected one of said left and right trailing arms for pivotal movement about a linkage arm lower axis, and pivotally mounted at its top end to said lower component of said shock absorbing means for pivotal movement about a linkage arm upper axis, with said linkage arm upper and lower axes being substantially parallel to said displaceable axis of rotation; and spring biasing means operatively mounted between said hub member and the selected trailing arm having said linkage arm mounted thereon, so as to bias said shock absorbing means to said extended configuration and to bias said left and right trailing arms to their respective forward positions.

2. The combination of claim 1, wherein said left and right trailing arms are disposed along a main axis, which main axis extends from said common pivot axis to said displaceable axis of rotation.

3. The combination of claim 1, wherein said main axis is disposed at an angle of about 20° with respect to vertical when said left and right trailing arms are in said respective forward positions.

4. The combination of claim 1, wherein said main axis is disposed at an angle of about 5° with respect to the horizontal when said left and right trailing arms are in said respective trailing position.

5. The combination of claim 1, wherein the distance along said trailing arms form said common pivot axis to said displaceable axis of rotation is between about 5 centimeters and 15 centimeters.

6. The combination of claim 5, wherein the distance along said trailing arms from said common pivot axis to said displaceable axis of rotation is about 12 centimeters.

7. The combination of claim 1, wherein said displaceable axis of rotation is disposed about 2 centimeters to 8 centimeters forwardly of said steering axis when said left and right trailing arms are in their respective forward positions.

8. The combination of claim 7, wherein said displaceable axis of rotation is disposed about 5 centimeters forwardly of said steering axis when said left and right trailing arms are in their respective forward positions.

9. The combination of claim 1, wherein said displaceable axis of rotation is disposed substantially on said steering axis when said left and right trailing arms are in their respective trailing positions.

10. The combination of claim 1, wherein the vertical distance between said displaceable axis of rotation and a fixed point on said hub member is decreasable by at least 15 centimeters from the respective forward positions to the respective trailing positions of said left and right trailing arms, by means of compression of said variable length shock absorbing means.

11. The combination of claim 1, wherein said linkage arm lower axis is disposed substantially between said common pivot axis and said displaceable axis of rotation.

12. The combination of claim 1, wherein said spring biasing means comprises a coil spring.

13. The combination of claim 12, wherein said coil spring is mounted between said upper component and said lower component of said variable length shock absorbing means.

14. The combination of claim 1, wherein said variable length shock absorbing means further comprises a fluidic damper.

15. The combination of claim 1, wherein said opposed left and right fork members are substantially identical one to the other.

16. The combination of claim 1, wherein said opposed left and right main fork members are disposed forwardly of said linkage arm.

17. In combination, a bicycle having a bicycle frame and a stability maintaining shock absorbing bicycle front fork and trailing arm assembly for mounting a front bicycle wheel on said bicycle for rotation of the front bicycle wheel about a displaceable axis of rotation, wherein said bicycle has a steering spindle pivotally mounted in a front frame portion thereof for pivotal movement of the steering spindle about a steering axis; wherein said stability maintaining shock absorbing bicycle fork and trailing arm assembly comprises:

- a hub member rigidly attached to said steering spindle for pivotal movement therewith;
- opposed left and right fork members each having a top end and a bottom end, and being rigidly attached adjacent their top ends to said hub member so as to depend therefrom;
- left and right trailing arms operatively mounted one on each of said left and right fork members, respectively, for pivotal movement of each trailing arm about a common pivot axis oriented generally parallel to said displaceable axis of rotation of said front bicycle wheel and generally perpendicular to said steering axis and disposed forwardly of said steering axis;
- bicycle wheel mounting means disposed one on each of said left and right trailing arms so as to permit mounting of a front bicycle wheel thereon such that the front bicycle wheel rotates about said displaceable axis of rotation;
- wherein, when said front bicycle wheel is mounted on said bicycle wheel mounting means on said left and right trailing arms, said left and right trailing arms are concurrently pivotally movable between a forward position whereat the displaceable axis of rotation of the front bicycle wheel mounted on said front fork and trailing arm assembly is disposed forwardly of said steering axis and between said steering axis and said common pivot axis, and a trailing position whereat the displaceable axis of rotation of the front bicycle wheel mounted on said front fork and trailing arm assembly is disposed closer to said steering axis than when in said forward position and is also displaced vertically closer to said common pivot axis than when in said forward position;
- a variable length shock absorbing linkage arm comprising an upper component having a top end and a bottom end, and a lower component having a top end and a bottom end, wherein said upper and lower components are slidably engaged one with the other for relative movement between an extended configuration and a compressed configuration, with said upper component pivotally mounted at its top end on said hub member for pivotal movement about a linkage arm upper axis, and with said lower component being pivotally mounted at its bottom end to a selected one of said left and right trailing arms for pivotal movement about a linkage arm lower axis, with said linkage arm upper and lower axes being substantially parallel to said displaceable axis of rotation; and
- spring biasing means operatively mounted between said hub member and the selected trailing arm having said linkage arm mounted thereon, so as to bias said shock absorbing means to said extended configuration and to bias said left and right trailing arms to their respective forward positions.

18. The combination of claim 17, wherein said displaceable axis of rotation is disposed about 2 centimeters to 8 centimeters forwardly of said steering axis when said left and right trailing arms are in their respective forward positions.

19. The combination of claim 18, wherein said displaceable axis of rotation is disposed about 5 centimeters forwardly of said steering axis when said left and right trailing arms are in their respective forward positions.

20. The combination of claim 17, wherein said displaceable axis of rotation is disposed substantially on said steering axis when said left and right trailing arms are in their respective trailing positions.

21. The combination of claim 17, wherein the vertical distance between said displaceable axis of rotation and a fixed point on said hub member is decreasable by at least 15 centimeters from the respective forward positions to the respective trailing positions of said left and right trailing arms, by means of compression of said variable length shock absorbing linkage arm.

22. The combination of claim 17, wherein said linkage arm lower axis is disposed substantially between said common pivot axis and said displaceable axis of rotation.

* * * * *